United States Patent
Duggal

(10) Patent No.: US 10,235,371 B1
(45) Date of Patent: Mar. 19, 2019

(54) INCREMENTAL PHYSICAL LOCALITY REPAIR FOR LIVE DATA

(71) Applicant: EMC Corporation, Hopkinton, MA (US)

(72) Inventor: Abhinav Duggal, Santa Clara, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 480 days.

(21) Appl. No.: 15/195,854

(22) Filed: Jun. 28, 2016

(51) Int. Cl.
*G06F 17/00* (2006.01)
*G06F 17/30* (2006.01)

(52) U.S. Cl.
CPC .. *G06F 17/30094* (2013.01); *G06F 17/30135* (2013.01)

(58) Field of Classification Search
CPC ......... G06F 17/30153; G06F 17/30371; G06F 17/30138; G06F 17/30501
USPC ....................................................... 707/693
See application file for complete search history.

(56) References Cited

U.S. PATENT DOCUMENTS

| | | | | |
|---|---|---|---|---|
| 8,825,720 B1* | 9/2014 | Xie | .................. | G06F 17/30156 707/694 |
| 9,195,672 B1* | 11/2015 | Pang | ................. | G06F 17/30371 |
| 9,367,448 B1* | 6/2016 | Botelho | .............. | G06F 12/0253 |
| 9,715,505 B1* | 7/2017 | Mondal | ............. | G06F 17/30138 |
| 9,984,090 B1* | 5/2018 | Shang | ............... | G06F 17/30153 |
| 2013/0262817 A1* | 10/2013 | Bybell | ................ | G06F 12/1018 711/208 |
| 2014/0081918 A1* | 3/2014 | Srivas | ................. | G06F 17/3007 707/639 |

* cited by examiner

*Primary Examiner* — Dung K Chau
(74) *Attorney, Agent, or Firm* — Workman Nydegger

(57) ABSTRACT

Systems and methods for incrementally repairing physical locality for live or active data are provided. Files that are enumerated to determine their locality are identified using dataless consistency points. The files are walked in order to measure their locality or at least the locality of their data segments. Locality repair is performed when the locality is greater than a threshold locality.

20 Claims, 3 Drawing Sheets

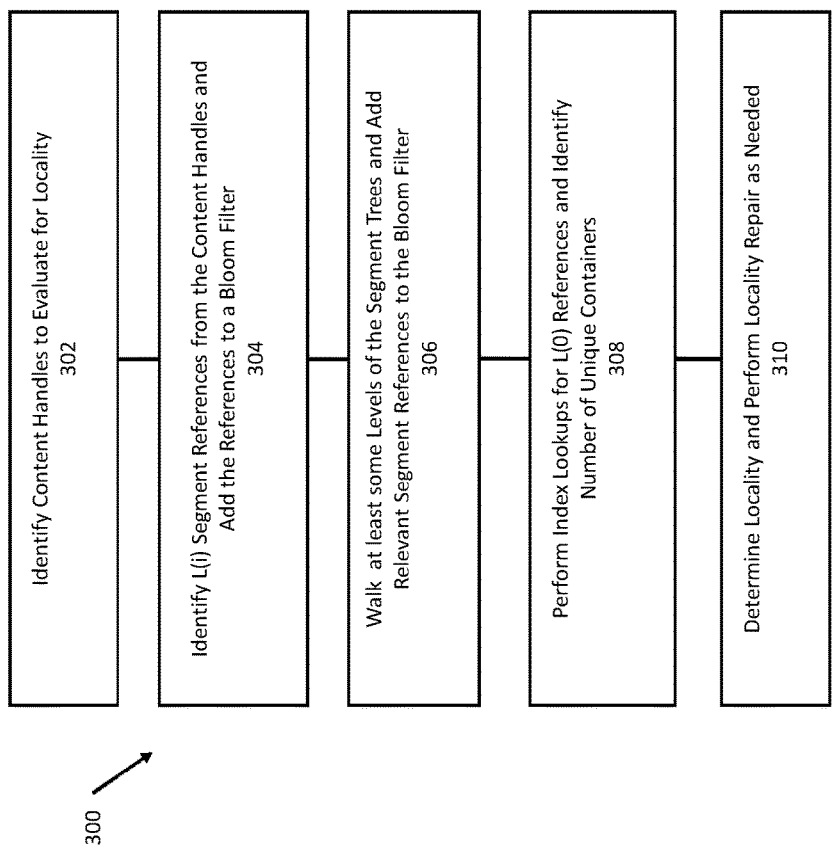

INCREMENTAL PHYSICAL LOCALITY REPAIR FOR LIVE DATA

FIELD OF THE INVENTION

Embodiments of the invention relate to systems and methods for managing data in a file system. Embodiments of the invention further relate to systems and methods for managing locality of live or active data in a file system and to systems and methods for repairing locality in a file system.

BACKGROUND

In general, computing systems must deal with a large amount of data. This is particularly true for computing systems that provide computing services such as backup services, content management, contact management, and the like, for many different clients. The amount of data can be terabytes and larger in sized.

The data managed by these computing systems may be accessed frequently depending on the service. Further, some of the data changes over time and may be de-duplicated. As a consequence of these changes, the data tends to become fragmented over time. When data in a file system becomes overly fragmented, the performance of the computing system begins to degrade.

Locality is a way to measure how fragmented a file is in a file system. When a file is stored as a segment tree having segment levels (e.g., L(0)-L(6)), the performance of locality measurement is sensitive to segment locality. Poor locality in the L(0) level, which includes data segments, results in multiple index lookups. This can impact performance. As the locality of the system continues to degrade, it takes a longer time to repair the locality. Further, locality measurement is not incremental in conventional systems. Systems and methods are needed to improve locality measurement and locality repair in a file system.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 3 illustrates and example of a method for repairing locality in a file system.

DETAILED DESCRIPTION OF SOME EXAMPLE EMBODIMENTS

Embodiments of the invention relate to systems and methods for managing data in a file system. Embodiments of the invention further relate to systems and method for repairing the locality of live or active data and to systems and methods for repairing the locality of files using dataless consistency points.

In one embodiments, a file system may store files using segment trees. A segment tree includes multiple segment levels. The upper levels may include metadata segments and the lower or lowest level may include data segments. More specifically, the file system maintains mappings of file address space into segments using a segment tree.

Figure 1:
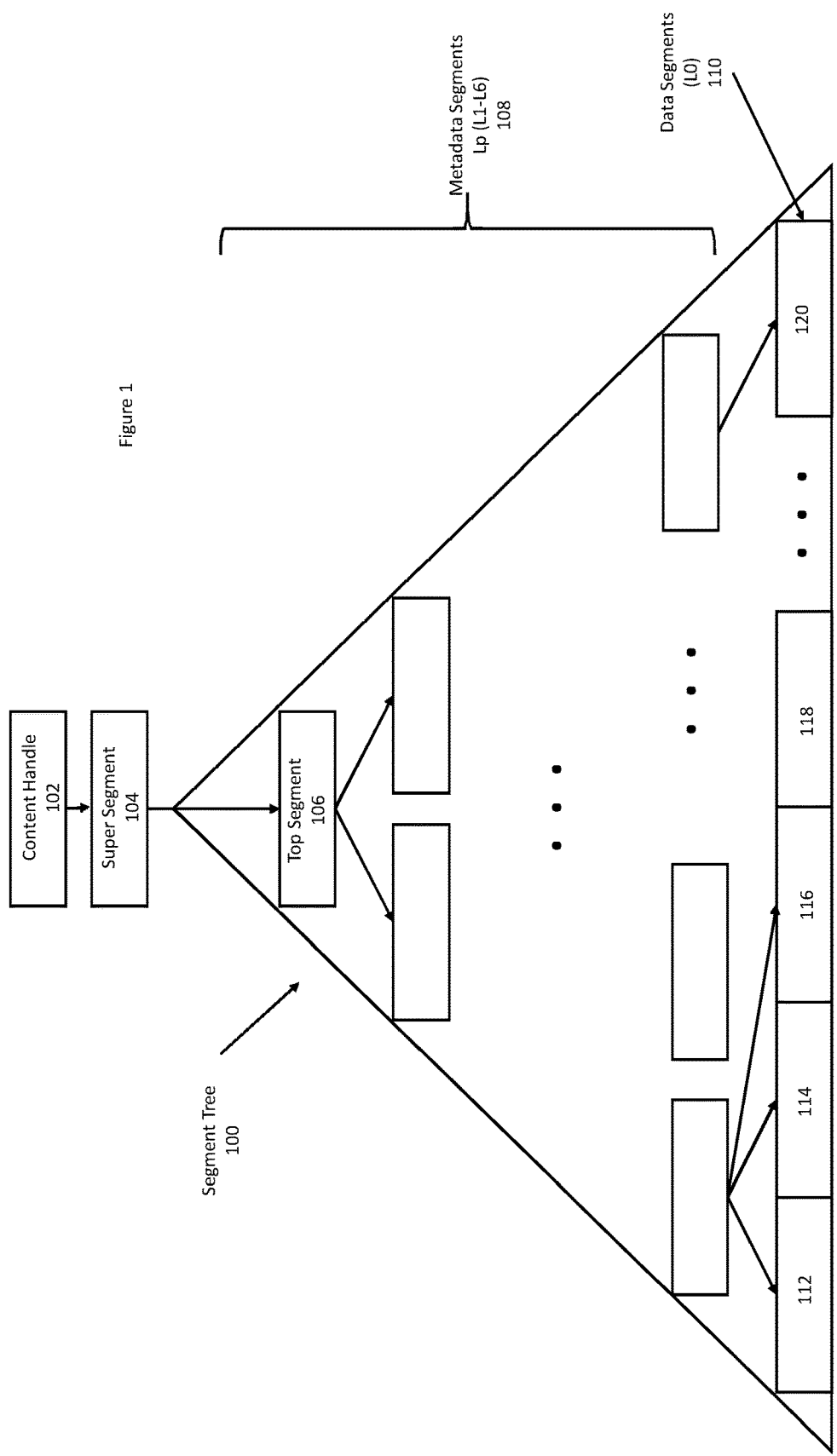
FIG. 1 illustrates an example of how files or data may be stored in a file system.

FIG. 1 illustrates an example of a segment tree that may be used in a file system. FIG. 1 illustrates a segment tree 100 that corresponds to a file (or other data representation). A content handle 102, at the top of the segment tree, represents the content of a file and typically points to the segment tree 100. A content handle 102, by way of example, may be similar to an inode. A content handle 102, for example, may be a reference or pointer to a segment tree (the file in one example) and may be assigned by an operating systems. In some examples, particularly in de-duplicated systems, some files may share certain segments.

The content handle 102 points to a super segment 104. The super segment 104 includes a reference to a top segment 106 of the segment tree 100 of the file. The segment tree 100 includes, by way of example only and not limitation, multiple levels (seven in this example). The levels include data segments 110 and metadata segments 108. The data segments are located in level L(0) and the metadata segments are located in levels L(1)-L(6) as illustrated in FIG. 1. L(0) is the lowest level of the segment tree.

Higher levels in the segment tree 100 include references (e.g., keys, identifiers, fingerprints, hashes, cryptographic hashes) to segments in lower levels in the segment tree 100. L(i) segments of level i typically includes references to L(i−1) segments. A reference can be a pointer or a representation of a segment. The reference may also be associated with or include the location of the referenced segment. In one example, references are configured to uniquely identify a segment. In this example, a cryptographic hash is an example of a reference.

For example, the segments in Level L6 (e.g., the top segment 106) include references to the segments in level L5, the segments in level L5 include references to segments in level L4, the segments in level L4 include references to segments in level L3, the segments in level L3 include references to segments in level L2, the segments in level L2 include references to segments in level L1, and the segments in level L1 include references to segments in level L0.

The segments of the segment trees in a file system are typically stored in containers. A container may storage a certain amount of data and may have a container header that identifies the segments stored in the container. In one example, segments of the same level may be stored in the same containers. For example, there may be containers that only store L(6) segments, containers that store L(5) segments, containers that store L(4) segments, containers that store L(3) segments, containers that store L(2) segments, containers that store L(1) segments, and containers that store L(0) segments. Some containers, of course may store segments associated with different levels of the segment trees.

As previously stated, the locations of the segments that belong to a particular file or to a particular segment tree may fragment over time. For example, the L(0) segments of a particular file may be stored in multiple different containers even if those containers contain L(0) segments. With reference to FIG. 1, the segments 112, 114, 116, 118 and 120 may each be stored in a different container. Alternatively, the segments 112, 114, and 116 may be stored in the same container while the segments 118 and 120 are stored in a different container.

The locality of a file is a way of measuring the fragmentation of a file. In one example, locality is defined by the number of containers actually loaded (or the number of containers that actually store segments of the file) divided by the ideal number of containers into which the segments could be stored. The ideal number of containers is defined by the logical size of the file divided by the local compression ratio times the container size.

By way of example and not limitation and without considering the compression ratio for simplicity, if a container size is 4.5 MB and a file has a size of 100 MB, then the file or segments can be ideally stored in approximately 23 containers: ideal number of containers=logical size of file divided by the container size. If the file is actually stored in 46 containers when the segments are enumerated, then the locality is approximately 2 in this example (46/23). In one example, the number of containers in which the file is stored may be determined from the data segments only.

The locality of a file can be measured by walking the segment tree of the file. This may involve loading or walking the metadata segments (e.g. levels $L(6)$-$L(1)$) and performing index lookups. In one example, the index is a structure that stores the mapping of segment (meta-data and data) to the container number the segment is present in. When a file or segment tree is walked, the highest $L(6)$ or $L(i)$ level is walked first to identify the $L(5)$ or $L(i-1)$ references. The index can be used to identify the locations of the $L(i-1)$ references by performing index lookups. This process can be repeated for each segment level of the file.

When the locality of a file is poor, locality repair is performed. The locality of the files can be improved, for example, by copying segments from different containers to new containers or to the same container or same set of containers. This allows the segments pertaining to the same segment tree or file to be more localized and in fewer containers. In one example, locality repair may only be performed for the data segments ($L(0)$ segments).

Embodiments of the invention also use dataless snapshots or dataless consistency points when repairing locality and when determining or measuring locality. In one example, a dataless snapshot is one in which the data pointed to by the snapshot is not locked and can be reclaimed by garbage collection. Each snapshot that is created out of or from the active namespace contains the content handles of the filed pointed to in the active namespace at the time the snapshot was taken. Even if the dataless snapshot contains the content handles, the segments pointed to by the content handles are not enumerated. Thus, the snapshot is dataless in this sense.

During garbage collection, starting from the content handle, all segments that are reachable are enumerated to find out which segments are live or active. Segments that are not live can be reclaimed by the garbage collector. In the case of a dataless snapshot, the content handle is still present in the snapshot of the namespace and is enumerated by garbage collector but the segments pointed by the content handles are not enumerated.

A consistency point, in one example, is a global snapshot of an entire file system. The consistency point represents the root of the file system. A root of the file system points to the namespace and the namespace contains the content handles that point to the segment trees of the files in the file system.

As previously described, conventional approaches to locality measurement are sensitive to $L(p)$ and $L(0)$ locality. When $L(p)$ locality degrades, it takes longer to logically enumerate files. Similarly, poor $L(0)$ locality results into more index lookups. Therefore as the locality of the file system degrades over time, locality repair takes a longer time. Further, locality measurement is not incremental in a conventional system. If a file is changed, the complete segment tree of the file needs to be enumerated again and locality measurement is performed once the file has been enumerated again.

According to embodiments of the invention, a consistency point is made dataless. The advantage of making the consistency points dataless is that the space pointed by the consistency points is not locked and can be reclaimed by garbage collection and the dataless consistency points do not lock up space in the file system. The dataless consistency points may contain content handles in one embodiment.

Dataless consistency points can be used to perform a global snapshot difference or comparison to identify the files that have changed between two consistency points. More specifically, when a file changes, the change is reflected in the content handle. The specific change, however, may not be included in the content handle. However, changes to a content handle indicate that the file or segment tree has changed in some manner. As a result, dataless consistency points can be differenced or compared in order to identify files that have changed between the two consistency data points. Embodiments of the invention use dataless consistency in the process of repairing locality of active files in a file system.

Figure 2:
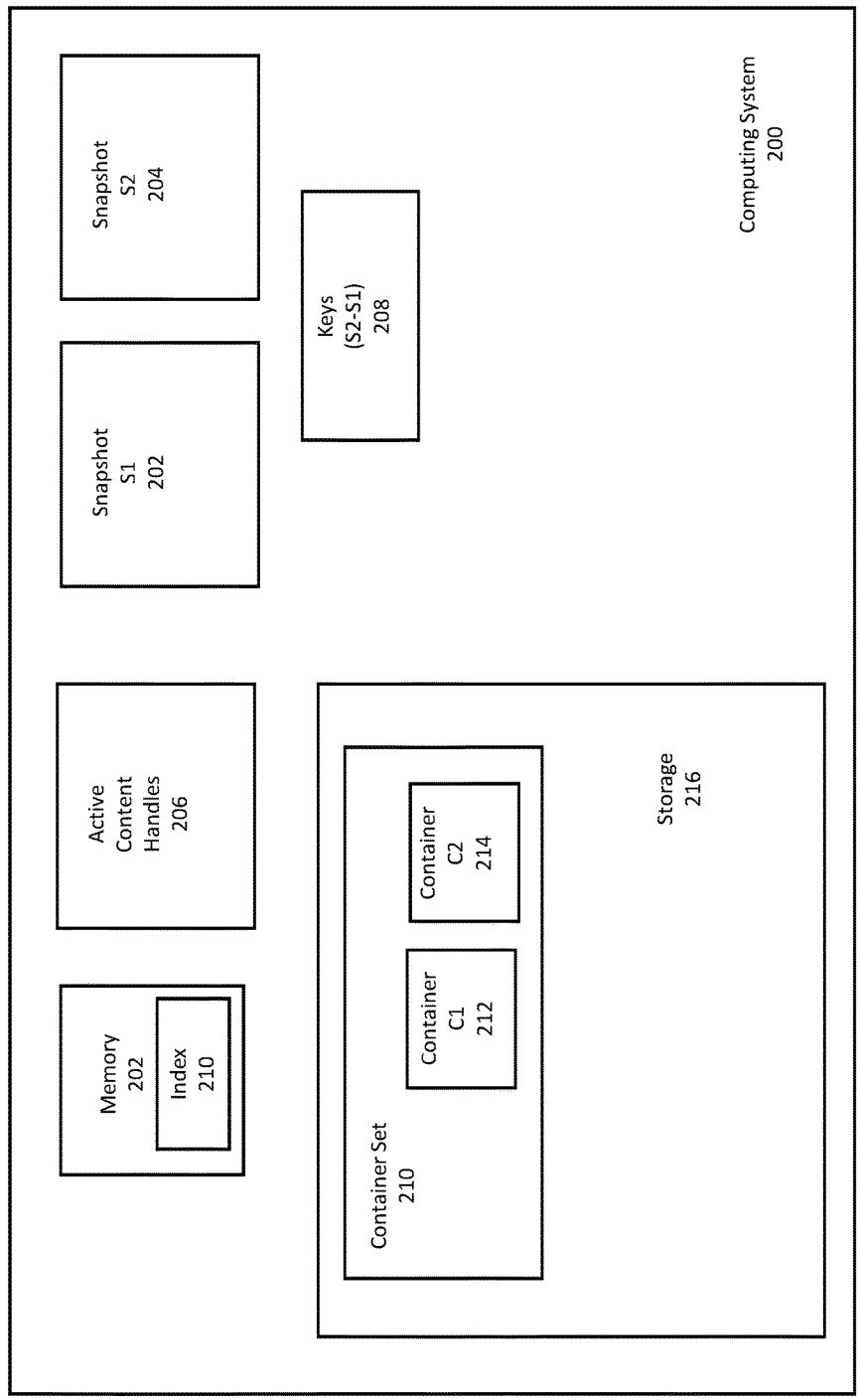
FIG. 2 illustrates an example of a computing system that includes a file system and is configured to repair locality of files in the file system.

FIG. 2 illustrates an example of a computing system in which locality of files can be repaired. The computing system 200 may include processors, storage devices, controllers and the like. The computing system may be a stand alone computing device that connects with other computing devices over a network. The computing system 200 may include networked components.

The computing system 200 of FIG. 2 illustrates a snapshot (S1) 202 and a snapshot (S2) 204. The snapshots 202 and 224 were taken at different times and the snapshot 204 was taken at a point in time after the snapshot 202. The snapshots 202 and 204 are examples of dataless consistency points or dataless global snapshots and each may contain the content handles of the files in the computing system 200 at a corresponding point in time. The content handles 206 includes the active content handles in the system 200.

FIG. 2 also illustrates a container set 210 that includes a container (C1) 212 and a container (C2) 214 in a storage 216. The storage 216 may be hard disk drives, flash storage, or the like. In this example, the containers 212 and 214 correspond to the snapshots 202 and 204. The files of the computing system 200 are stored in the storage 216.

FIG. 2 illustrates keys 208 that are identified by differencing the snapshots 202 and 204 (S2-S1). Files that (i) have changed between the snapshot 202 and the snapshot 204 but (ii) are the same between the snapshot 204 and the active content handles 206 are closed files and are the files evaluated for locality.

For all of the keys 208 (e.g. (S2-S1), CH is a content handle in a snapshot S and S can be any of S1, S2, or the active content handles 206.

If CH(KeyS1) !=CH(KeyS2) && CH(KeyS2)==CH (Keyactive) then Get L6 from CH(Keyactive).

In other words, if a content handle (CH(keyS1)) from the snapshot 202 is not equal to the content handle (CH(keyS2)) and if the same content handle (CH(keyS2)) is equal to the content handle from the active content handles (CH(keyActive)), then the $L(6)$ segment or segment reference for that content handle is obtained from the content handle (CH (keyActive)). Content handles that are the same in the snapshot 202, the snapshot 204 and the active content handles 206 may not be examined for locality or repaired because locality repair may have already been performed at a previous time. In one embodiment, files that have changes and that may have fragmented are examined.

With reference to FIG. 1, this corresponds to obtaining the top segment 106, which is an L(6) segment in this example, based on the content handle 102. A similar process is performed for all of the keys 208. This results in a plurality of L(6) segments or segment references. This process identifies the segment trees or files for which locality repair may be performed. Before performing locality repair, embodiments of the invention measure the locality. In one embodiment, only files whose locality is greater that a threshold are repaired. The threshold can be predetermined or set by a user.

Embodiments of the invention enumerate the content handles from the active content handles 206 because the snapshot 202 and the snapshot 204 are dataless.

Thus, if the content handle of the file in the active content handles 206 is same as the content handle of the file in the snapshot 204, the content handle is enumerated or walked from active content handles 206. The segments of the file pointed to by the active content handles 206 cannot be reclaimed by garbage collection.

Once the content handles are identified by comparing or differencing the snapshots 202 and 204 in the context of the active content handles 206, the L(6) references can be obtained from the identified content handles and added to a Bloom filter. Next, the container set 210, which contains the containers 212 and 214 in this example (a container set may include a different number of containers) are walked to identify L(6) segments. If any of the L(6) segments identified by walking the container set 210 are present in the bloom filter, the L(5) references included in those L(6) segments are added to the bloom filter.

Next, the container is walked for L(5) segments. For all L(5) segments found while walking the container set that are also in the Bloom filter, the L(4) references in those L(5) segments are added to the Bloom filter. This process is repeated for L(4) segments, L(3) segments, L(2) segments, and L(1) segments.

When the container set is walked for L(1) segments such that L(0) references are read from these L1 segments, an index lookup is performed for L(0) segments corresponding to the L(0) references present in the L(1) segments. The number of unique containers loaded per L(1) segment is then counted. In other words, the index lookup based on the L(0) references allows the computing system 200 to determine how many containers include L(0) segments for a given L(1) segment or for a given segment tree.

The number of unique containers loaded for the L(1) segments can be divided by the ideal number of containers to determine the locality of each L(1) segment. When the locality is worse than a predetermined or set locality, locality repair is performed. Locality repair is performed by reading L(0) segments from different containers and writing them to a new container. This fixes or reduces the locality of the L(0) segments pointed to by the L(1) segment. More specifically, the fixes or reduces the locality of data segments L(0) segments that are pointed to by metadata segments L(1). Stated differently, the L(0) segments are moved such that the L(0) segments for a file are in the same container or same containers.

For all L(1)s with inadequate locality, locality repair is performed by reading L(0) segments from different containers and copying them into a new container(s). This fixes the locality of the L(0) data segments referenced by the L(1) meta-data segments.

In contrast to conventional locality measurements, embodiments of the invention allow locality to be measured incrementally for new segments because the physical walk is done level by level (L(6) to L(0)) for segments in a container range only (e.g., the container set 210) in one embodiment. Once the locality of the segments in the container set 210 has been measured and repaired, the locality of the next container set can be performed.

Further, locality is measured only for live or active segments in one embodiment because the segments tree traversal is performed from content handles in the active namespace (active content handles 206) down to segment level L(0). Finally, the locality measured for the data segments is independent of the locality of metadata segments and, in one embodiments, locality may be performed only for active or live segments with poor locality.

FIG. 3 illustrates an example of a method for repairing locality. The method 300 may determine the locality of a segment level or a segment tree and can be adapted to determine the locality of multiple levels or any level of the segment tree. The method 300 also performs locality if the locality is determined to be inadequate (e.g., greater than a threshold locality). The method 300 may be performed for a container set and then repeated for other container sets in the computing system.

In box 302, the content handles to be evaluated are identified. Content handles to be evaluated may be identified by comparing to taking the difference between two different dataless consistency points or global snapshots. Content handles or files that are different as between the two consistency points but are the same as between the later in time snapshot and the active content handles are considered for locality repair. The content handles or files are enumerated from the active content handles and not from the dataless snapshots.

In box 306, the highest level of the segment tree (e.g., L(i) or L(6) segments) from the content handles are determined and the L(i) references are added to a data structure such as a Bloom filter or hash table. For by decrementing i from i to 1, the levels of the segment trees can be walked. For a given container set in one example, The L(i) level is walked from the data to identify all of the L(i) segments that are also in the data structure. In one example, L(i) references that in the container set that are not in the data structure or Bloom filter may not be walked at this time. They may be subject to garbage collection, for example, or may have been previously localized.

For each of the L(i) references found in the container set that are also in the data structure, their L(i−1) references are added to the data structure. Once completed i is decremented and a similar process is followed. This is repeated down to the L(1) segment level.

In box 308, an index lookup is performed for the L(0) references and the number of unique containers is determined. In other words, the index lookup allows the method to determine how many containers the L(0) segments are actually stored in by counting the number of unique containers referenced when looking up the L(0) references in the index.

In box 310, the locality is determined by dividing the actual number of containers by the ideal number of containers. The ratio of compression may also be considered when determining the locality of the L(0) segments for each L(1)

segment or for the L(1) segments collectively. Locality repair may be performed when the locality is worse that a threshold locality.

Locality can be repaired by moving the L(0) segments so that they are actually located in fewer containers. The actual number of containers can be substantially reduced and the locality of a file can be substantially improved.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for repairing locality of a file in a file system stored on a storage device, the method comprising:
   identifying segment references to a highest segment levels of segment trees based on content handles that point to segments in the highest segment levels;
   walking each level of the segment trees down to L(1), wherein L(0) references in the L(1) segments are identified;
   performing an index for each of the L(0) references to determine a number of containers that include the L(0) segments; and
   determining a locality based on the number of containers and an ideal number of containers for the L(0) segments.

2. The method of claim 1, further comprising identifying the segment references to the highest segment levels by performing a difference between a first consistency point and a second consistency point that is later in time than the first consistency point.

3. The method of claim 2, wherein the first and second consistency points are dataless and contain content handles.

4. The method of claim 3, wherein content handles that are different as between the first and second consistency point and are the same as between the second consistency point and active content handles are used to identify the segment references to the highest segment levels of the segment trees.

5. The method of claim 1, further comprising repairing locality of L(p) segments, wherein p is 1 or greater.

6. The method of claim 1, further comprising writing L(0) segments referenced by each L(1) segment to the same container or same set of containers to reduce the actual number of containers that contain L(0) segments.

7. The method of claim 1, further comprising adding L(i−1) references for each L(i) in a container set that is also associated with the identified content handles.

8. The method of claim 1, wherein the data structure comprises a Bloom filter.

9. The method of claim 1, further comprising performing garbage collection for segments that are not reachable from an active content handle.

10. The method of claim 1, wherein levels L(6)-L(1) include metadata segments and level L(0) includes data segments.

11. A method for repairing a locality of files in a file system, the method comprising:
   determining keys by differencing a first consistency point and a second consistency point;

for each key that is different between the first consistency point and the second consistency point and that is the same between the second consistency point and active content handles, identify a reference to an L(i) segment;
adding the reference to the L(i) segment to a Bloom filter;
walking the L(i) level of segments trees in a container set;
repeating while i>=to 2:
  for each L(i) segment in the container set that is also referenced in the Bloom filter, adding L(i−1) references to the Bloom Filter; and
  decrementing i;
performing index lookups for each L(0) reference in the L1 segment;
determining a number of unique containers referenced while looking up the L(0) references;
determining a locality, for each L(1) segment, of the L(0) segments referenced by the L(1) segment; and
repairing the locality of each L(1) segment which results in repairing the locality of the data segments (L0) for the file.

12. The method of claim 11, wherein each key is configured for use in the Bloom filter.

13. The method of claim 11, wherein the i initially equals 6, wherein levels L(6)-L(1) are walked.

14. The method of claim 11, further comprising repairing a locality of the files on another container set.

15. The method of claim 11, further comprising determining a locality of L(1) segments, L(2) segments, L(3) segments, L(4) segments, L(5) segments, or L(6) segments.

16. The method of claim 11, wherein the container set includes more than 2 containers.

17. The method of claim 11, wherein the locality is measured incrementally when locality is repair for successive container sets.

18. The method of claim 11, wherein the locality corresponds to a locality of active data segments in the file system.

19. The method of claim 11, wherein a locality of data segments in the segment trees is independent of metadata segments in the segment trees.

20. The method of claim 11, further comprising repairing locality only for active segments in the segment trees.

* * * * *